Patented Dec. 11, 1951

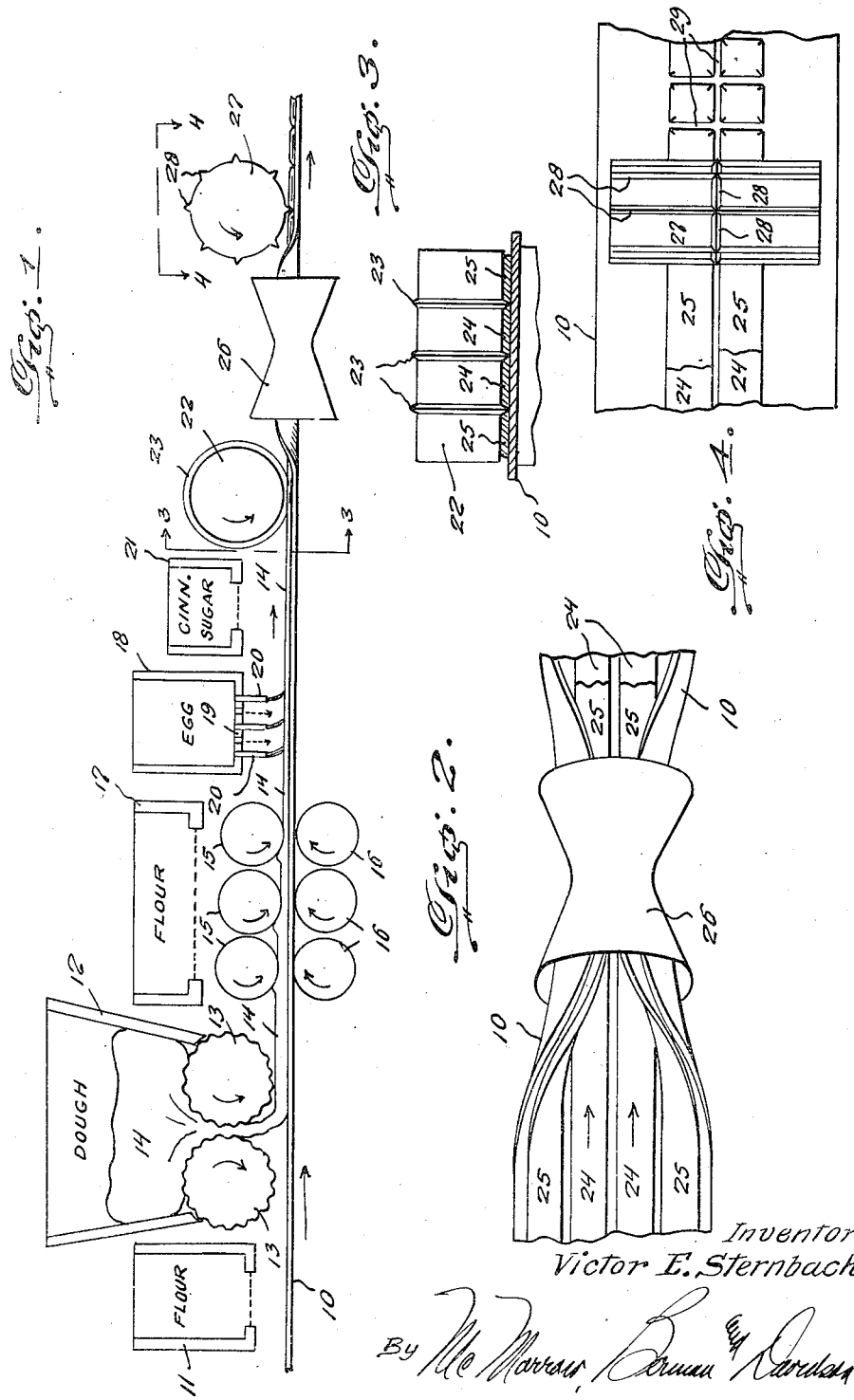

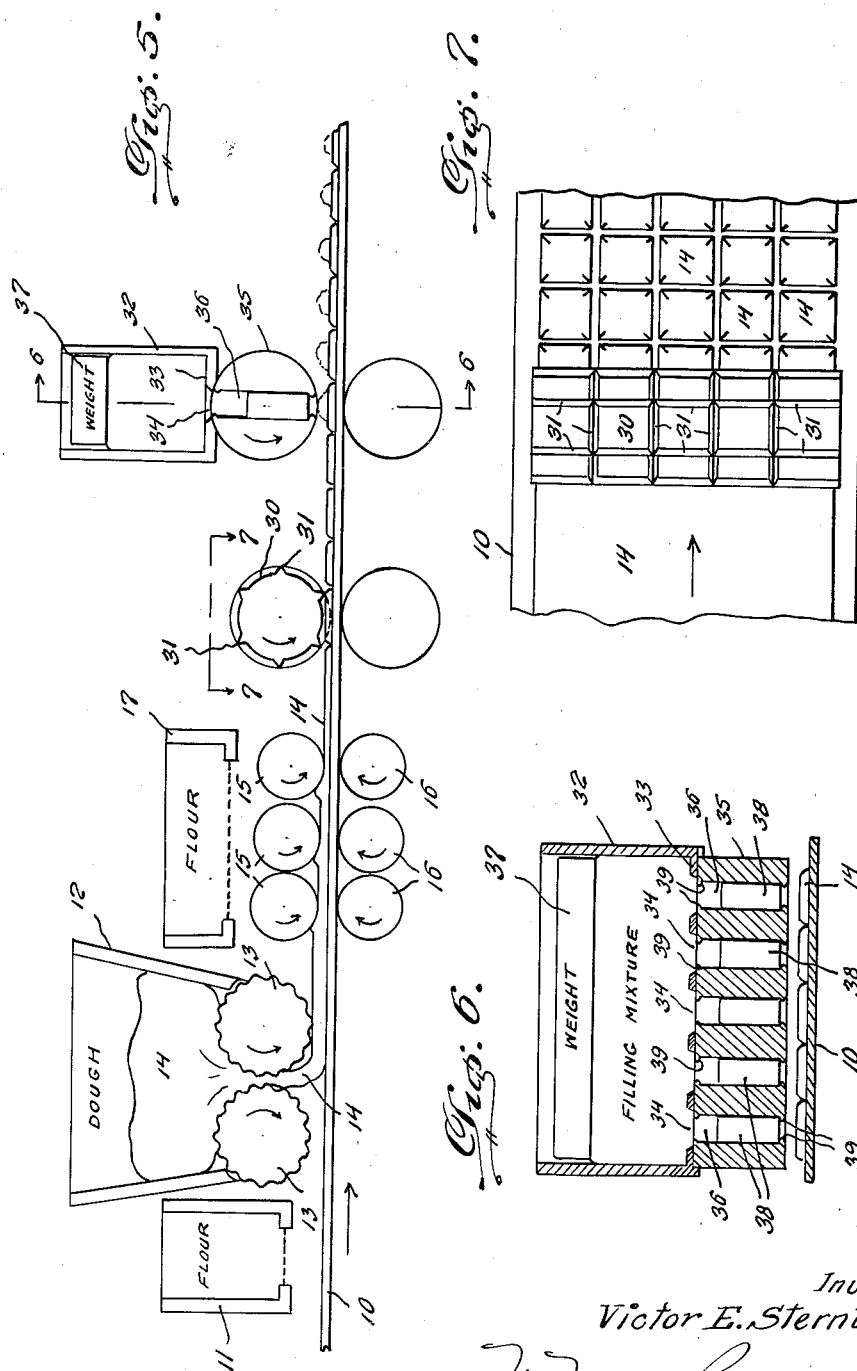

2,577,925

UNITED STATES PATENT OFFICE 2,577,925

DOUGH SHAPING, TREATING, AND FILLING DEVICE

Victor E. Sternbach, Bronx, N. Y.

Application March 22, 1946, Serial No. 656,440

2 Claims. (Cl. 107—1)

My invention relates to bakery machines and more particularly to dough shaping, treating and filling devices.

The object of my invention is to provide a device to form dough into a sheet and form it then into any desired shape.

Another object of my invention is to provide a device for handling and treating dough adapted to form the dough into a strip consisting of a plurality of layers.

A further object of the invention is to provide a device for handling and shaping dough adapted to put filling of any desired material onto the dough treated by the device.

Other objects of the invention may appear in the following specification describing it with reference to the accompanying drawings illustrating preferred embodiments thereof.

It is however to be understood that my invention is not to be limited or restricted to the exact construction and combination of parts described in the specification and shown in the drawings, but that such changes and modifications can be made, which fall within the scope of the claims appended hereto.

In the drawings:

Figure 1 is a diagrammatical side view of an arrangement of cooperating devices for forming, treating, cutting and folding dough during the process of baking Danish and other kinds of pastry, cookies and the like.

Figure 2 is a detail top view of a funnel-shaped device for folding adjacent strips of dough formed on a conveyor belt on top each other.

Figure 3 is a sectional view taken on line 3—3 in Fig. 1.

Figure 4 is a top view taken on line 4—4 in Fig. 1.

Figure 5 is a diagrammatical side view of an arrangement of cooperating devices for forming and treating dough, and adding filling thereto during the process of baking buns and the like.

Figure 6 is a sectional view taken on line 6—6 in Figure 5, and

Figure 7 is a top view taken on line 7—7 in Figure 5.

Referring now to the drawings in detail, the arrangement forming the subject matter of my invention includes a conveyor belt 10. The mechanism driving this belt does not form a part of my invention and therefore it is neither shown nor described. Above the conveyor belt a flour shaker 11 of any well-known and desired construction is arranged to sprinkle flour on the conveyor belt 10 to prevent dough from sticking to the belt. Adjacent the flour shaker 11 a dough receptacle 12 is located above the conveyor belt 10. The bottom of this receptacle is formed by two corrugated cylinders 13, which are driven in opposite directions to each other as indicated in Figures 1 and 5. The driving means for these and other cylinders and parts do not form any part of my invention and are therefore neither shown nor described.

The dough 14 is pulled out of the receptacle 12 by the corrugated cylinders 13 and falls onto the conveyor belt 10 in the shape of a sheet. A plurality of pairs of rollers 15 and 16 are arranged adjacent the dough receptacle 12 so that the rollers 16 are located underneath the conveyor belt 10. The rollers 15 are located above the conveyor belt so that the axes of each pair of rollers 15 and 16 are located in the same vertical plane. The upper rollers 15 are arranged so that the distance between the rollers of each pair decreases as the distance from the dough receptacle 12 increases. The rollers extend over the entire width of the conveyor belt 10 so that the dough will be rolled out over the entire belt and become thinner the farther it is carried by the belt. Above the rollers 15 a flour shaker 17 is provided to sprinkle flour on the rollers to prevent dough from sticking thereto.

Adjacent the last roller 15 a container 18 is located above the conveyor belt. This container is filled with beaten eggs and has a perforated bottom 19. A plurality of brushes 20 extend downwardly from the bottom 19 and spread the egg over the entire surface of the sheet of dough 14 on the conveyor belt 10.

Next to the egg container 18 a shaker 21 is arranged to sprinkle cinnamon, sugar or the like on the sheet of dough.

Adjacent the shaker 21 a cylinder 22 extends transversely over the conveyor belt. It is equipped with three circumferential cutting flanges 23, which are arranged so that they cut the sheet of dough into four strips of equal width, two inner strips 24 and two outer strips 25.

The conveyor belt 10 with the four strips of dough thereon travels then through a funnel-shaped folder 26, which causes the belt to fold each outer dough strip 25 on top of the adjacent inner strip 24.

A cylinder 27 is located adjacent the folder 26 and is provided on its circumference with cutting flanges 28 so that the two-ply strips of dough on the conveyor belt are cut thereby as indicated at 29 in Fig. 1 and Fig. 4.

In Figures 5, 6 and 7 a modified construction of parts is shown. The conveyor belt 10 is sprinkled with flour by the shaker 11. Dough 14 is placed on the belt by the corrugated cylinders 13 and is spread and thinned out by the rollers 15 and 16, which are sprinkled with flour by the shaker 17.

A cylinder 30 is arranged adjacent the last roller 15 and has cutting flanges 31 thereon, to cut the sheet of dough 14 into predetermined shapes and sizes.

Back of the cutting cylinder 30 a container 32 is located above the conveyor belt 10. A filling mixture such as cheese, jelly, etc. is put in this container. The bottom 33 of the filler container 32 is provided with a plurality of openings 34. A cylinder 35 fits closely underneath the filler container 32 and has diametrically extending holes 36 therein, which correspond to the openings 34 in the container bottom 33. A heavy lid 37 is provided for the container 32 and fits slidably therein so that it forces the filling mixture into the holes 36 in the cylinder 35. In each of these holes a weight 38 is slidably arranged so that it acts similar to a piston and forces the dough received in the hole 25 cut of it when the cylinder 35 has gone through a turn of 180 degrees. At the same time filler mixture is received on the other end of the hole 36. Small projections 39 are provided on the ends of the holes 36 to prevent the weights 38 from sliding out of the holes.

While the cutting cylinders 22, 27 and 30 are shown in the drawings as having their cutting flanges arranged so that the dough is cut into squares of predetermined size, it is to be understood that these flanges may be arranged so as to form any desired shape such as triangles, circular disks, shapes of animals and the like.

By using the above described combinations and arrangement of parts time and labor is saved in baking and in addition to that the work is done sanitarily, because the used materials are not touched by the hands. Furthermore, the bakery goods produced are always of an equal predetermined size.

Having described my invention, I claim as new and desire to secure by Letters Patent:

1. In a device of the class described, the combination with a horizontal conveyor belt arranged to carry a compacted dough sheet forwardly, means for cutting the dough sheet comprising a transverse cutting cylinder positioned above the conveyor belt with its surface engaging the dough sheet, said cutting cylinder having axially spaced circumferential cutting ribs projecting therefrom to sever the dough sheet into at least four laterally adjacent strips, and means for elevating the outer strips and overturning them in laterally inward directions onto the adjacent inner strips to form double strips.

2. In a device of the class described, the combination with a horizontal conveyor belt arranged to carry a compacted dough sheet forwardly, means for cutting the dough sheet comprising a transverse cutting cylinder positioned above the conveyor belt with its surface engaging the dough sheet, said cutting cylinder having axially spaced circumferential cutting ribs projecting therefrom to sever the dough sheet into at least four laterally adjacent strips, and means for elevating the outer strips and overturning them in laterally inward directions onto the adjacent inner strips to form double strips, said conveyor belt being flexible and normally flat, said means comprising an hourglass shaped tube smaller in diameter than said conveyor belt positioned forwardly beyond said cutting cylinder and through which said conveyor belt passes so as to have its side edge portions overturned in laterally inward directions to overturn the outer dough strips onto the adjacent inner dough strips, said belt being arranged to resume its normal flat disposition upon emergence from said tube.

VICTOR E. STERNBACH.

REFERENCES CITED

The following references are of record in the file of this patent:

UNITED STATES PATENTS

| Number | Name | Date |
| --- | --- | --- |
| 319,991 | Morhard | Jan. 16, 1885 |
| 661,999 | Kessler | Nov. 20, 1900 |
| 745,018 | Kessler | Nov. 24, 1903 |
| 1,396,881 | Rolin | Nov. 15, 1921 |
| 1,522,738 | Miller | Jan. 13, 1925 |
| 2,028,470 | Nordby | Jan. 21, 1936 |
| 2,217,896 | Fonken | Oct. 15, 1940 |
| 2,261,043 | Winfree, Jr. | Oct. 28, 1941 |
| 2,337,539 | Buechek | Dec. 28, 1943 |
| 2,405,661 | MacManus | Aug. 13, 1946 |